United States Patent
Brome et al.

(10) Patent No.: US 8,186,473 B2
(45) Date of Patent: May 29, 2012

(54) HYDROSTATIC GROUND DRIVE CONTROL SYSTEM FOR A WORK MACHINE WITH SMOOTH TRANSITION BETWEEN SPEED RANGES

(75) Inventors: John G. Brome, Janesville, WI (US); Douglas Wolken, Paxton, IL (US)

(73) Assignee: CNH America LLC, New Holland, PA (US)

(*) Notice: Subject to any disclaimer, the term of this patent is extended or adjusted under 35 U.S.C. 154(b) by 555 days.

(21) Appl. No.: 12/469,447

(22) Filed: May 20, 2009

(65) Prior Publication Data

US 2010/0293935 A1 Nov. 25, 2010

(51) Int. Cl.
*B60K 17/00* (2006.01)

(52) U.S. Cl. .......................... 180/307; 60/420

(58) Field of Classification Search .............. 180/242, 180/54.1, 305, 307, 308; 701/50; 60/420, 60/421, 422, 423; 417/245, 280
See application file for complete search history.

(56) References Cited

U.S. PATENT DOCUMENTS

| | | | | |
|---|---|---|---|---|
| 2,097,857 A | * | 11/1937 | Ferris et al. ................... | 165/202 |
| 2,766,834 A | | 10/1956 | Boyer | |
| 3,092,970 A | | 6/1963 | Sampietro | |
| 3,106,108 A | * | 10/1963 | Thoma et al. ................... | 475/83 |
| 3,194,017 A | * | 7/1965 | Weisenbach .................... | 60/487 |
| 3,272,278 A | * | 9/1966 | Budzich ........................ | 180/243 |
| 3,273,344 A | * | 9/1966 | Mooney, Jr. et al. ............ | 60/426 |
| 3,285,000 A | * | 11/1966 | Christenson et al. ........... | 60/423 |
| 3,339,660 A | * | 9/1967 | Budzich ........................ | 180/243 |
| 3,354,978 A | * | 11/1967 | Budzich ........................ | 180/243 |
| 3,521,450 A | * | 7/1970 | Martin .......................... | 60/443 |
| 3,540,220 A | * | 11/1970 | Lauck ........................... | 60/423 |
| 3,542,274 A | * | 11/1970 | Miller .......................... | 228/2.3 |
| 3,628,330 A | * | 12/1971 | Miller .......................... | 60/448 |
| 3,633,700 A | | 1/1972 | Matthews | |
| 3,724,583 A | * | 4/1973 | Caldwell ....................... | 180/307 |
| 3,736,732 A | * | 6/1973 | Jennings et al. ................ | 56/10.9 |
| 3,736,813 A | * | 6/1973 | Kress et al. .................... | 475/82 |
| 3,897,697 A | * | 8/1975 | Chambers et al. .............. | 475/80 |
| 3,978,937 A | | 9/1976 | Chichester et al. | |
| 4,126,994 A | * | 11/1978 | Rockwell ....................... | 60/420 |
| 4,130,980 A | | 12/1978 | Fardal et al. | |
| 4,140,196 A | | 2/1979 | Brewer | |
| 4,244,184 A | | 1/1981 | Baldauf et al. | |
| 4,396,087 A | | 8/1983 | Rock et al. | |
| 4,399,886 A | * | 8/1983 | Pollman ........................ | 180/197 |
| 4,402,181 A | * | 9/1983 | Acker et al. .................... | 60/427 |
| 4,570,741 A | * | 2/1986 | McCoy ........................ | 180/242 |
| 4,696,367 A | | 9/1987 | Delfs | |
| 4,903,792 A | * | 2/1990 | Ze-ying ........................ | 180/308 |
| 5,030,177 A | * | 7/1991 | Reed ............................ | 475/24 |
| 5,518,461 A | * | 5/1996 | Pfordt .......................... | 475/72 |
| 5,553,453 A | * | 9/1996 | Coutant et al. ................. | 60/327 |

(Continued)

*Primary Examiner* — J. Allen Shriver, II
*Assistant Examiner* — Brodie Follman
(74) *Attorney, Agent, or Firm* — Michael G. Harms

(57) ABSTRACT

The control system allows selecting from multiple speed ranges for the ground drive of a work machine without a mechanical transmission. The system does this by controlling a variable displacement fluid pump supplying fluid to variable displacement fluid motors driving ground wheels of the machine. When a speed range is selected, the system automatically controls displacement of the pump and motors to provide operability within the range by movement of a speed input device. When another range is selected, the system provides a seamless transition, including to and from reverse, as no disengaging and engaging of mechanical gears, or change in the speed input position, is required. The system can also automatically adjust ground speed for the new speed range for the current speed input position.

28 Claims, 12 Drawing Sheets

U.S. PATENT DOCUMENTS

| | | | |
|---|---|---|---|
| 5,576,962 A | 11/1996 | Ferguson et al. | |
| 5,848,664 A * | 12/1998 | Kaspar | 180/308 |
| 6,145,287 A | 11/2000 | Rosskopf | |
| 6,358,174 B1 * | 3/2002 | Folsom et al. | 475/72 |
| 6,865,870 B2 | 3/2005 | Heisey | |
| 7,712,565 B2 * | 5/2010 | Udagawa et al. | 180/242 |
| 2005/0177297 A1 | 8/2005 | Berger et al. | |
| 2006/0069484 A1 * | 3/2006 | Thomson et al. | 701/50 |
| 2007/0130931 A1 | 6/2007 | Burgart et al. | |
| 2010/0050620 A1 * | 3/2010 | Basana et al. | 60/327 |
| 2010/0293935 A1 * | 11/2010 | Brome et al. | 60/420 |
| 2011/0202243 A1 * | 8/2011 | Ishibashi et al. | 701/51 |

* cited by examiner

HYDROSTATIC GROUND DRIVE CONTROL SYSTEM FOR A WORK MACHINE WITH SMOOTH TRANSITION BETWEEN SPEED RANGES

TECHNICAL FIELD

This invention relates generally to a control system for a hydrostatic ground drive of a work machine, and more particularly, to a control system which provides selectable speed ranges without requiring a mechanical transmission, preprogrammed smooth uninterrupted transitions between the speed ranges and other features, and automatic adjustments to a new speed within the new range corresponding to the position of a speed input device.

BACKGROUND ART

It is well known to provide hydrostatic ground drives for work machines such as agricultural combines and the like. Such drives typically include one or more fluid pumps operable for supplying pressurized fluid to one or more fluid motors in driving relation, respectively, to the drive wheels of the vehicle. Speed output of the drives is changed in a variety of ways. For example, a main and a supplemental pump arrangement can be provided, wherein use of the supplemental pump is triggered by demand for power or speed. As another example, the displacement of the pump or pumps and/or motor or motors is varied, for instance, under command of a propulsion handle or throttle. Engine speed can also be varied to increase or decrease pump output. Additionally, it is known to provide such drives in combination with multiple speed mechanical transmissions which can be shifted to provide discrete speed ranges.

Reference in the above regard, Burgart et al., U.S. Patent Publication No. 2007/0130931, which discloses hydraulic transmission controls with alternative operating modes wherein a swash plate of the transmission can be moved to any of a plurality of discrete positions based on the position of a manually operable switch, and wherein swash plate position can be varied to achieve different vehicle speeds.

Problems and shortcomings of known control systems for work machines such as combines include that a mechanical transmission may require operation in a low speed range for times of high torque requirements, such as field operation and the like, and transition to a higher speed range for road travel. The transition, particularly in heavily loaded machines such as agricultural combines, can take several seconds, making a transition to the higher speed range more difficult. Also, sometimes it may be desirable to change the combine speed range while the combine is stationary and on a slope, or subject to another condition or conditions, which would place the gear teeth of a mechanical transmission under loads that make shifts difficult. Additionally, control systems of combines typically utilize a multi-function handle movable by an operator in a forward range for varying forward speed, and movable in a reverse range for varying reverse speed, but some multi-function handles have a dead band about the neutral position which makes transition to that position non-linear and even rough and delayed.

What is sought therefore, is a control system for a hydrostatic ground drive for a work machine such as an agricultural combine, which provides selectable discrete speed ranges, but without requiring a mechanical transmission, which provides smooth, seamless transitions between the speed ranges, automatic speed adjustment for the new range, and which overcomes one or more of the problems and shortcomings set forth above.

SUMMARY OF THE INVENTION

What is disclosed is a control system for a hydrostatic ground drive for a work machine such as an agricultural combine, which provides selectable different speed ranges, but without requiring a mechanical transmission, which provides smooth, seamless transitions between the speed ranges, automatic speed adjustment for the new range, and which overcomes one or more of the problems and shortcomings set forth above.

According to a preferred aspect of the invention, the control system includes a variable displacement fluid pump connected in fluid communication with a plurality of variable displacement fluid motors connected in rotatably driving relation to ground wheels of the machine, respectively. The system includes a programmable processor based controller in operative control of the displacement of the pump and the displacements of the motors, respectively. The system also includes an operator controllable first input device or speed input, for instance, a propulsion or multi-function handle, in connection with the controller and configured to be movable for communicating variable speed signals thereto. In particular, the first input device is movable through a range of forward positions for outputting forward speed signals to the controller, through a range of reverse positions for outputting reverse speed signals thereto, and to a neutral position for outputting a neutral position signal thereto. The system includes an operator controllable second input device connected to the controller and configured so as to be usable by an operator for selecting and inputting speed range command signals to the controller, including at least a first speed range command signal and a second speed range command signal. And, the controller is programmed to automatically simultaneously control the displacements of the pump and the motors in a substantially inverse relationship as a function of the speed signal inputs, including:

a. responsive to changing speed signals for increasing a speed of rotation of the fluid motors, to automatically decrease the displacements of the motors and simultaneously increase the displacement of the pump in a predetermined manner;

b. responsive to changing speed signals for decreasing a speed of rotation of the fluid motors, to automatically increase the displacements of the motors and simultaneously decrease the displacement of the pump in a predetermined manner; and c. responsive to a change in the speed range command signal, to automatically change the displacements of at least the motors in a predetermined manner to predetermined values, respectively, corresponding to the speed signal being outputted by the first input device.

As another preferred aspect of the invention, the controller is programmed and the second input device is configured, to provide four forward speed ranges, as commonly provided by conventional mechanical transmissions of agricultural combines. Of these speed ranges, a first is a low or field range, for use when harvesting under conditions requiring only low ground speed operation, a fourth is a road speed range, for higher speed operation such as when traveling between fields, and the second and third ranges are midranges.

Also preferably, responsive to the neutral signal, the controller is programmed to automatically hold the displacement of the pump at about a predetermined minimum value therefor and simultaneously hold the displacements of the motors at about a predetermined maximum value therefor, such that the motors are not drivingly rotated, to simulate the neutral position of the multi-function or propulsion handle of a work machine drive.

As another preferred aspect of the invention, the controller is preferably programmed to smoothly and seamlessly transition in a predetermined manner between the speed ranges when changed, such that rough shifts are avoided. This is advantageous compared to shifting a mechanical transmission, particularly, when stationary with the gear teeth of the transmission under load, as it involves only changing pump and motor displacements, not actual gears.

According to yet another preferred aspect of the invention, the controller is programmed such that the higher speed ranges include and exceed the lower speed ranges. For instance, if system is configured such that the first speed range is from 0 to 5 miles per hour (MPH), the second speed range can be configured to be from 0 to 10 MPH; the third range from 0 to 15 MPH; and the fourth from 0 to 20 MPH, as non-limiting examples. And, because these ranges are achieved using an inverse relationship of pump and motor displacements, and do not require a mechanical gear shift, they can be seamlessly changed.

As still another preferred aspect of the invention, when a four wheel drive capability is desired, as is common for agricultural combines, the drive can be configured such that at least one of the motors is connected in driving relation to the rear wheels of the machine, and the controller can be programmed to control the displacement of that motor or motors for drivingly rotating the rear wheels only when the first speed range command signal or the second speed range command signal is received by the controller. This capability can be activated using a special input command, e.g., a rear axle assist command, via one of the existing input devices, or an additional input device.

Still further, directional changes can be made by movement of the first input device through the neutral position between the reverse and forward ranges, and the system will automatically change the direction of operation of the motors, for instance, by changing the direction of flow of fluid output of the pump, again, seamlessly, and without a disruptive movement, jerking and the like.

As noted above, the first input device preferably comprises a multi-function handle, to simulate commonly used combine controls, and the other input device or devices, can be incorporated into that control, be located on a separate console or screen, or other desired location.

DETAILED DESCRIPTION OF THE INVENTION

Figure 1:
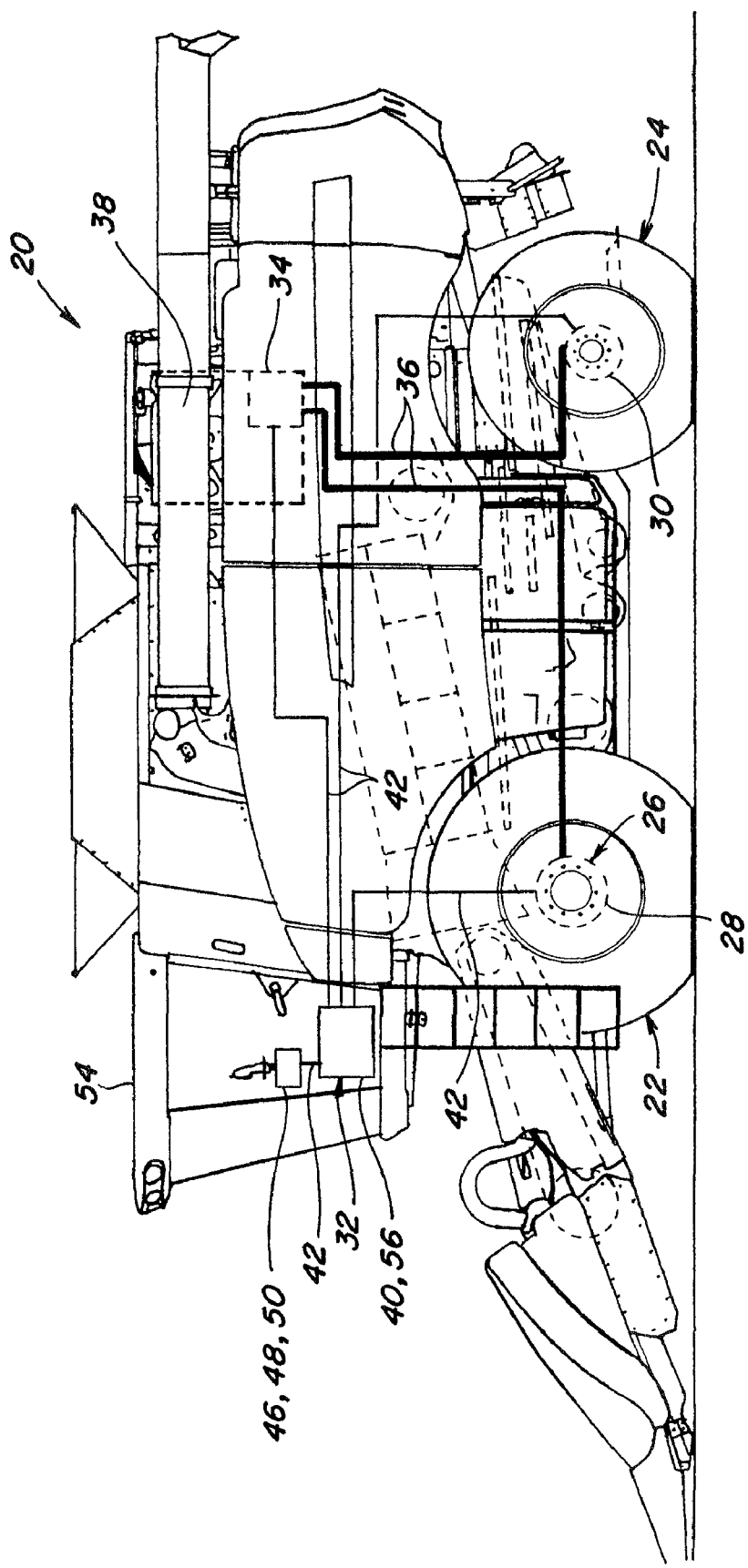
FIG. 1 is a simplified side view of a representative work machine, which is an agricultural combine, including a hydrostatic ground drive controllable using the control system of the invention.

Referring to FIG. 1, a representative self-propelled work machine, which is an agricultural combine 20, is shown, including a pair of front drive wheels 22, and a pair of rear drive wheels 24. Drive wheels 22 and 24 are rotatably driven by a hydrostatic ground drive 26, including fluid powered, variable displacement front wheel motors 28 connected to front drive wheels 22, respectively, and fluid powered, variable displacement rear wheel motors 30 connected to rear drive wheels 24, respectively. Motors 28 and 30 of drive 26 are operable for propelling combine 20 over a field for harvesting crops therefrom in the well known manner, and also over roads and the like, for travel to, from, and between, fields.

Figure 2:
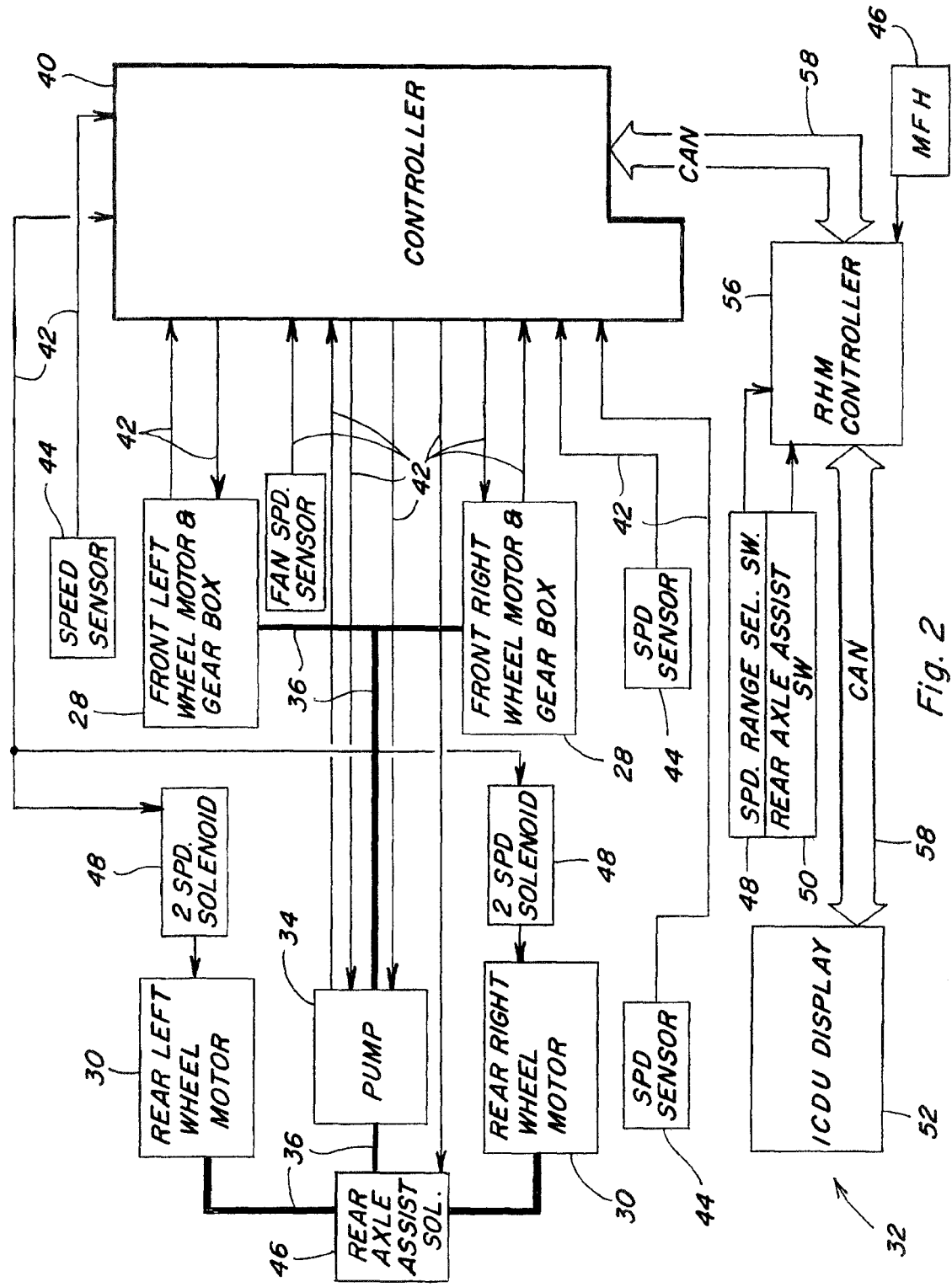
FIG. 2 is a diagram of a preferred embodiment of the system of the invention.

Referring also to FIG. 2, a control system 32 constructed and operable according to the present invention, is shown connected in operative control of drive 26. Drive 26 includes a variable displacement fluid pump 34 connected via fluid paths 36 to motors 28 and 30, respectively. Pump 34 is driven by an engine 38 (FIG. 1) of combine 20, for supplying pressurized fluid to motors 28 and 30. The displacement of motors 28 and 30, and pump 34, is under control of a programmable, processor based controller 40 of system 32, connected thereto via suitable conductive paths 42, which can be, for instance, wires of a wiring harness, a wired or wireless communications network, or the like. The displacements of respective motors 28 and 30, and pump 34 are suitably controllable via electrical signals, for instance, pulse width modulated signals, using solenoids or the like in connection therewith, respectively. Direction of fluid flow from pump 34 to the motors is controlled using suitable valves or by changing the direction of swash plate tilt of the pump, under control of controller 40, for changing the direction of operation of the motors and thus the direction of travel of combine 20. Suitable sensors in connection with motors 28 and 30, and pump 34, provide displacement feedback, and speed sensors 44 provide speed data for the motors, communicated to controller 40 via conductive paths 42.

Powered operation of rear motors 30 is preferably optional, and is limited to only a certain speed range or ranges, namely, a first or lowest speed range, and a second speed range, via operation of a rear axle assist solenoid 46, and 2 speed solenoids 48, also connected to controller 40 via conductive paths 42.

As important operation aspects of the invention, it is desired to have the capability to operate ground drive 26 in multiple speed ranges, preferably about four forward speed ranges, and at least one reverse speed range. It is desired for the speed ranges to be overlapping, and to encompass normal speed ranges for a combine such as combine 20. As a non-limiting example, suitable forward speed ranges can be a first speed range of from 0 to about 5 miles per hour (mph); a second speed range of from 0 to about 10 mph; a third speed range of from 0 to about 15 mph; and a fourth speed range of 0 to 20 mph. Generally, the first and second speed ranges would be more suited for field operation and the third and fourth ranges more for road travel. Reverse speed ranges preferably include a first speed range of from 0 to about 5 mph; and a second speed range of from 0 to about 10 mph, both mostly for field operation and maneuvering.

Here, it should be noted that it is desired to have the capability when in the higher speed ranges, to operate at lower speeds, without requiring a mechanical gear shift, and without the delays, jerking, lurching, etc., typically experienced when operating a mechanical transmission in too high of a gear for present conditions. Another desired operational capability is to be able to shift between, or change, the speed ranges relatively smoothly and seamlessly, without annoying delays, jerking, etc., particularly when under load, such as when moving or stationary and oriented facing up or down hill. In regard to the former, it is also desired to utilize a conventional rotary or slide type multi-function or propulsion handle or other device for controlling the ground speed of combine 20, and to have the capability to change speed ranges without changing handle position, with the ground speed automatically changing to a speed corresponding to the handle position for the new speed range. In the latter regard, it is desired to have the capability to change speed ranges with a simple effort, such as by changing position or state of a switch or the like, as opposed to having to move a mechanical gear shift lever under load, as required for a mechanical transmission.

Still further, it is desired to have a capability to automatically control acceleration and/or deceleration in the respective speed ranges in a manner appropriate for the individual speed range, and to change between forward and reverse operation relatively seamlessly and smoothly. Sudden handle movements may be filtered to prevent operator injury or equipment damage; rapid machine deceleration may require foot braking.

Control system 32 preferably includes a first input device 46, preferably configured as a multi-function or propulsion handle (MFH), operable by an operator for inputting speed signals or commands to system 32; a second input device 48, configured as a speed range selector switch, and operable by an operator for inputting speed range signals or commands to the system; a third input device 50, configured as a rear axle assist switch, operable by an operator for selecting powered operation of rear motors 30; and a display device 52 which will display the operating states of the system and other information. Each of these devices will be conveniently located, such as in an operator cabin 54 (FIG. 1) of combine 20. As one preferred manner of system construction, input devices 46, 48 and 50 are connected to a second programmable processor based controller 56, which, in turn, is connected to and communicates with controller 40 and display device 52 via a controller area network (CAN) 58. Direction of travel, speed range, ground speed, and rear axle assist modes are selected by an operator using input devices 46, 48 and 50. The operating modes of the input devices are converted by controller 56 into input signals communicated to controller 40 and display device 52 via the CAN. Controller 40 then processes the signals and executes the commanded speed range, speed and direction conditions by outputting displacement control signals to pump 34, motors 28, and motors 30 if rear axle assist is selected.

Figure 3:
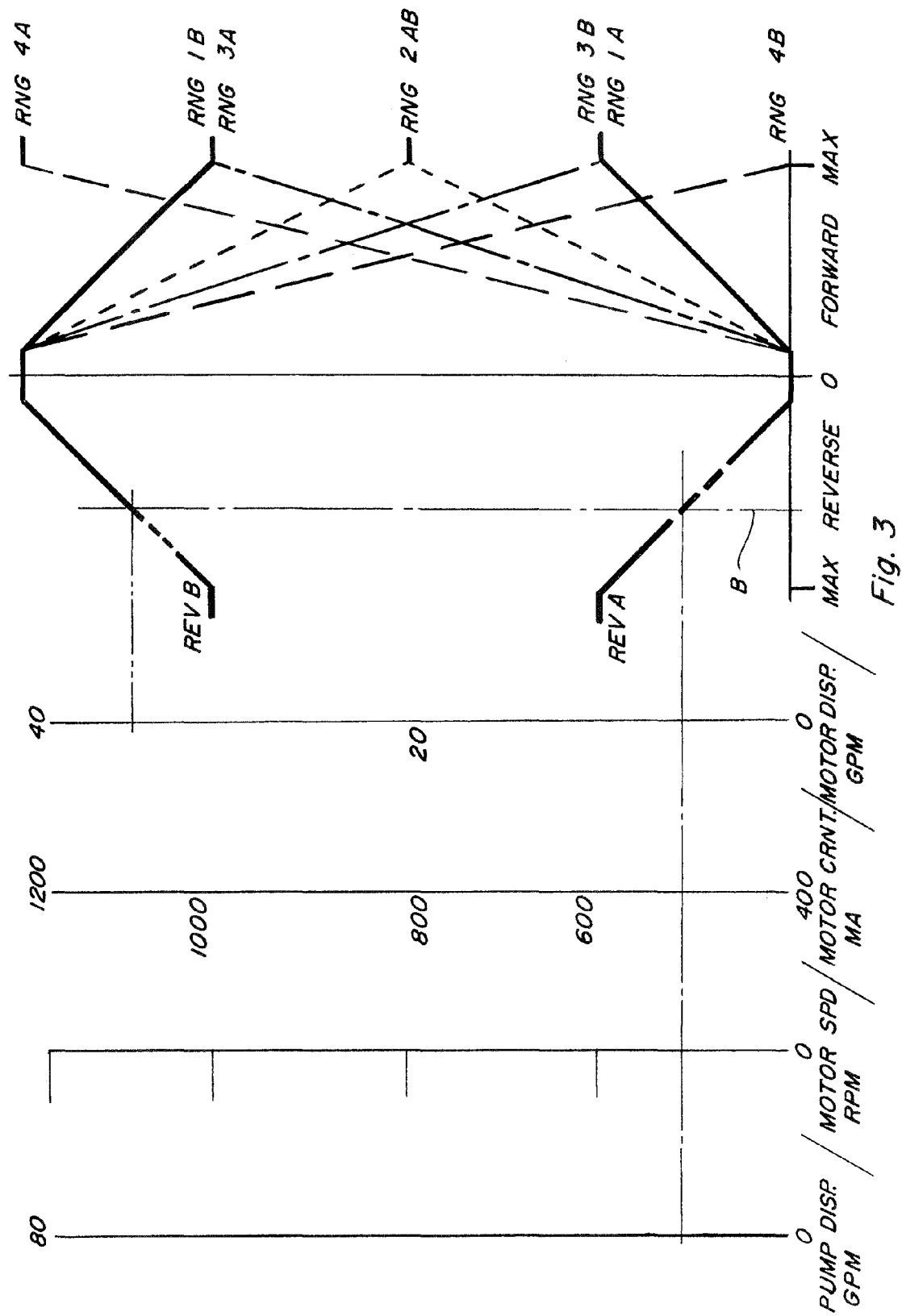
FIG. 3 is an diagram showing operating parameters of the system for several speed ranges, including pump displacement, motor speed, motor current, and motor displacement.

Referring also to FIG. 3, a representative diagrammatic representation of preferred pump and motor displacement in gallons per minute (GPM) verses MFH position for each of the four forward speed ranges (denoted as RNG 1, RNG 2, RNG 3 and RNG 4, respectively) and a single reverse speed range of system 32, is shown. Forward positions of the MFH (representative of handle position of input device 46) are denoted by FORWARD on the horizontal axis to the right of the vertical axis, and reverse positions are denoted by REVERSE. A neutral position of the MFH is denoted by the zero value on the horizontal axis. It can be observed that the depicted displacement verses handle position relationship for each of the speed ranges is substantially linear, and that pump displacement (curves RNG 1A, RNG 2A, RNG 3A AND RNG 4A) and motor displacement (curves RNG 1B, RNG 2B, RNG 3B and RNG 4B) are inversely related. That is, with an increase in MFH position towards the maximum value, pump displacement (RNG 1A, RNG 2A, RNG 3A AND RNG 4A) will increase, while motor displacement (RNG 1B, RNG 2B, RNG 3B and RNG 4B) will decrease. It can also be observed that the depictions of pump displacement (RNG 1A, RNG 2A, RNG 3A AND RNG 4A) are also representative of electrical current values for PWM control signals outputted to motors 28, and resulting motor speed. In the latter regard, it can also be observed that, for each speed range, a decrease in motor displacement (RNG 1B, RNG 2B, RNG 3B and RNG 4B), either alone or in concert with an increase in pump displacement results in an increase in motor speed. Here, it should be noted that while inverse linear relationships of pump and motor displacement are illustrated, other relationships could be utilized as desired or required for a particular application. It should also be noted that representative values for pump displacement, a single motor displacement, a motor current signal, and motor speed, are depicted along the vertical axis of the diagram, but are for illustrative purposes only, and are not to be interpreted as limiting.

Using FIG. 3 to illustrate operation of control system 32, for RNG 1, it can be observed from curves RNG 1A and RNG 1B representing the slowest speed range, that, for the range of MFH positions between the neutral position and the maximum FORWARD position, the pump displacement has a predetermined range of values from about zero to a predetermined maximum displacement value for that speed range, which is well under the maximum overall displacement capability for the pump. At the same time, the motor displacement has a predetermined range of values from about its maximum displacement value to a predetermined minimum displacement value for that speed range, which is well above the minimum displacement value for the motor. In contrast, for curves RNG 4A and RNG 4B representing the fastest speed range, for the range of MFH positions between the neutral position and the maximum FORWARD position, the pump displacement has a predetermined range of values from about zero to about the maximum overall displacement capability for the pump. At the same time, the motor displacement has a predetermined range of values from about its maximum displacement value to a predetermined minimum displacement value for that speed range, which is about the minimum displacement value for the motor. The displacement value curves for RNG 2 and RNG 3 are between those for RNG 1 and RNG 4.

Figure 4:
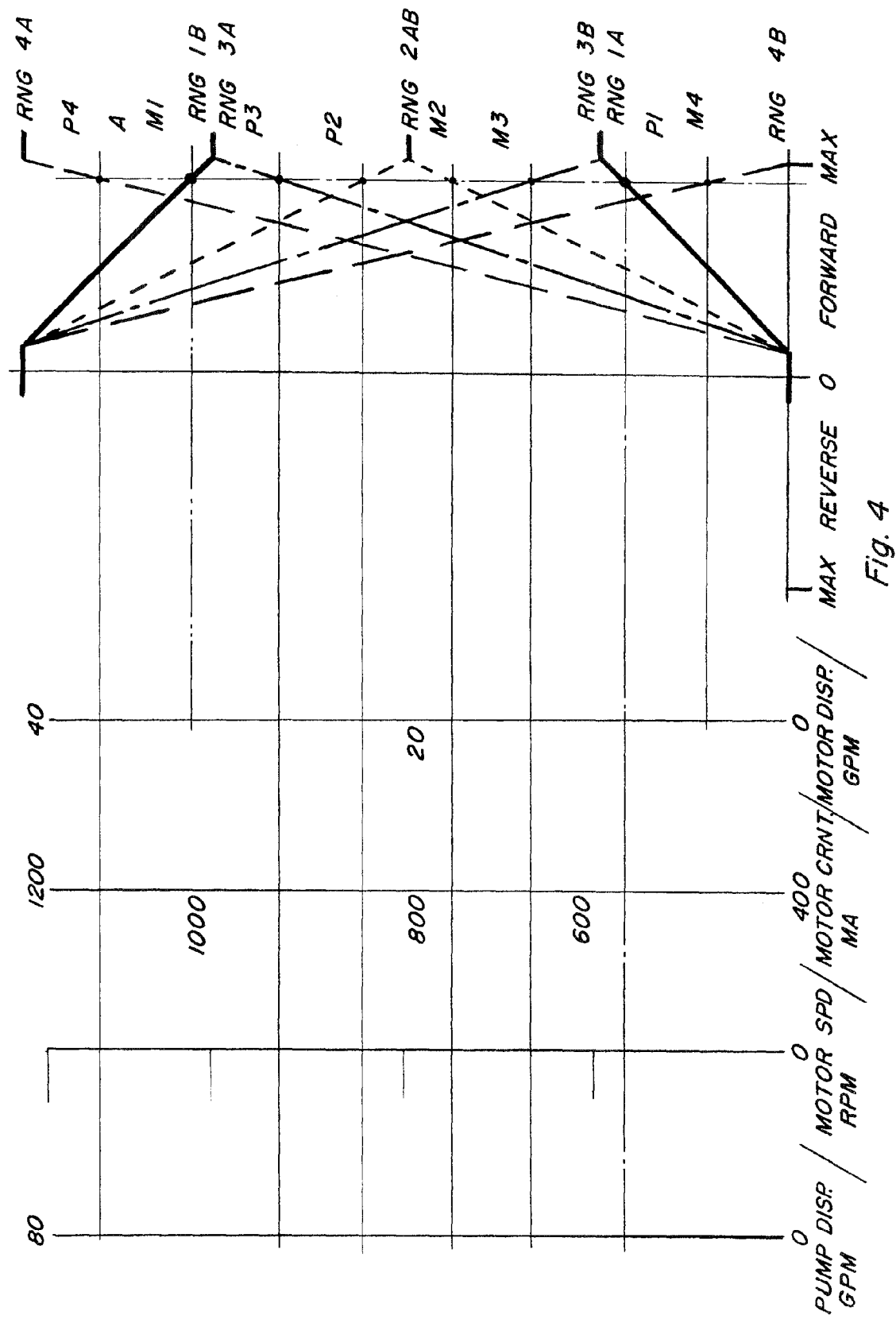
FIG. 4 is another diagram showing the operating parameters of the system, illustrating the effects of speed range changes.

Referring also to FIG. 4 to illustrate the relationship of pump and motor displacement, the displacement verses MFH position curves for forward movement in RNGs 1-4 are again shown. Here, a vertical line A is shown at a position along the horizontal axis, close to the maximum MFH position. If system 32 is operating in RNG 4, one would look at the intersection of line A with curve RNG 4A at a position P4 to determine the displacement at which controller 40 will automatically hold pump 34, which is close to its maximum displacement as illustrated by following the intersecting horizontal line to the left. Line A intersects curve RNG 4B at a location M4 at which controller 40 will hold motor displacement, which is close to its minimum value as illustrated by following its intersecting horizontal line. The result will be that pump 34 will pump fluid at nearly its maximum level, while motors 28 will be at low displacement, so as to be rotated at near maximum speed to handle that flow, as also found by following the intersecting horizontal line from point P4. Now, if the operator selects RNG 3 without moving the MFH, which would be analogous to downshifting of a mechanical transmission, controller 40 will automatically and simultaneously change the pump displacement to a value P3 along vertical line A, and the motor displacement to a value M3, without further operator action. As can be seen, this will reduce pump displacement, and increase motor displacement, as evidenced by following the intersecting horizontal lines, which will reduce the rotational speed of the motors, as also shown by the intersecting horizontal lines. These displacement changes will be made at a predetermined automatic rate, as discussed below, which will result in a substantially smooth and seamless speed change. Similarly, selection of range RNG 2 (analogous to another downshift) will result in pump displacement being automatically changed in a predetermined controlled manner to value P2, and motor displacement to value M2, which will reduce the speed of motors 30 to an even lower level. As non-limiting examples, value M4 may represent a ground speed of about 18 MPH, value M3 may represent a ground speed of about 13 MPH, and value M2 may represent a ground speed of about 8.5 MPH. And, a further speed range change to RNG 1, would result in automatic pump and motor displacement changes to values P1 and M1, to achieve a corresponding ground speed reduction (analogous to a downshift again) to about 4.5 MPH.

In the above examples, as will be shown, it should be noted that controller 40 will preferably be programmed to execute the displacement changes to those for the new speed ranges in a predetermined manner, to control the desired ground speed changes to avoid undesired deceleration rates and corresponding abrupt or jerking movements and other undesirable operating characteristics typically experienced with a mechanical transmission. It should also be noted that at any time using the present system, the operator can adjust or fine tune ground speed by moving the MFH to a desired position, and that controller 40 will automatically control the commanded speed change in a manner to also avoid abrupt or jerking movements.

Referring still to FIG. 4, speed range changes to higher speed ranges, that is, up shifts, can also be made. For example, with the MFH in the close to maximum position illustrated with speed range RNG 2 selected, pump displacement will be at value P2, and motor displacement at value M2. Then, if RNG 3 is selected, that is, analogous to an up shift of a mechanical transmission, controller 40 will responsively automatically respond. Here, though, it should be noted that pump displacement need not be changed. Thus, for this change, motor displacement will be reduced to value M3, which will achieve a corresponding increase in motor speed. Up shifts from RNG 1 to RNG 2, and from RNG 3 to RNG 4 will be processed similarly. Here, it should be noted that controller 40 can be programmed to accelerate and decelerate at different rates, for instance, as a function of the present speed range and the selected speed range, and/or MFH position, or another condition or conditions.

Referring briefly again to FIG. 3, a vertical line B is shown drawn through curves REV A and REV B depicting the pump and motor displacements for operation in the reverse direction. Vertical line B represents about a midrange MFH position, and horizontal lines intersecting line B show pump and motor displacements for that position, respectively. Again, motor signal current and speed can also be determined by following the horizontal line to the left from the intersection of line B with curve REV B. Here, it should be noted that the reverse motor speed range is depicted as corresponding to that of forward speed range RNG 2, but that other speed ranges, independent of the forward speed range values, could be selected. As a non-limiting example, it may be desired for the reverse speed range to correspond with that of the first forward speed range RNG 1 (thus be a mirror image of curves RNG 1A and 1B), so that equal forward and reverse MFH movements will effect about equal forward and reverse movements of combine 20, for instance, when maneuvering in tight spaces at low speeds, or rocking back and forth to drive out of mud or other low traction conditions.

Figure 5:
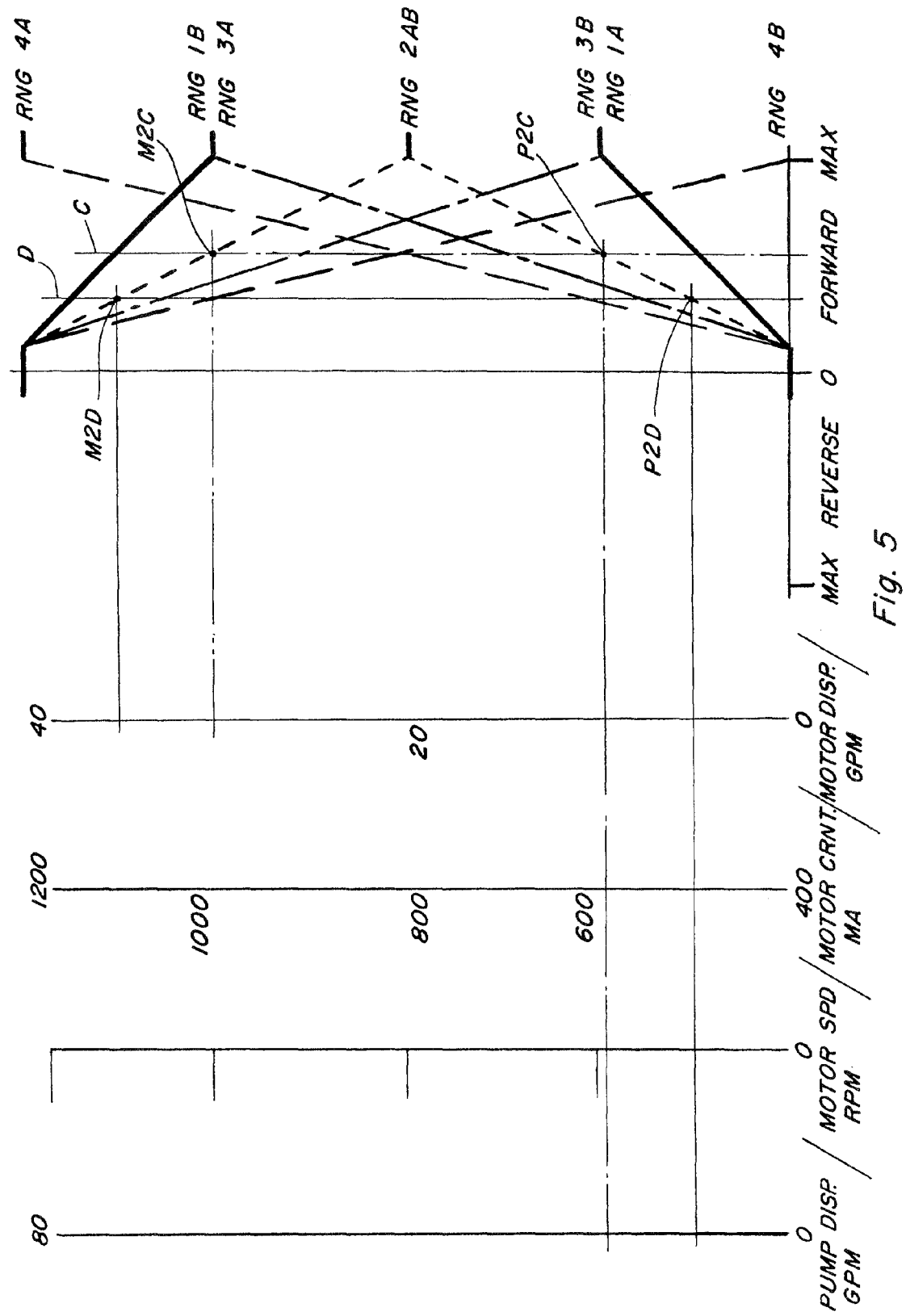
FIG. 5 is another diagram showing the operating parameters of the system, illustrating the effects of speed changes.

Referring also to FIG. 5, the displacement verses forward MFH position ranges are again shown, a vertical line C being representative of a midrange MFH position. Here, intersecting horizontal lines show pump and motor displacement (values P2C and M2C, respectively) for operation in RNG 2. And again, the operator can adjust speed as desired or required by moving the MFH. For example, decreasing MFH position to correspond with vertical line D, would result in changes to pump and motor displacement values P2D and M2D, respectively, in a predetermined manner, that is, at a predetermined rate, as explained below.

Figure 6:
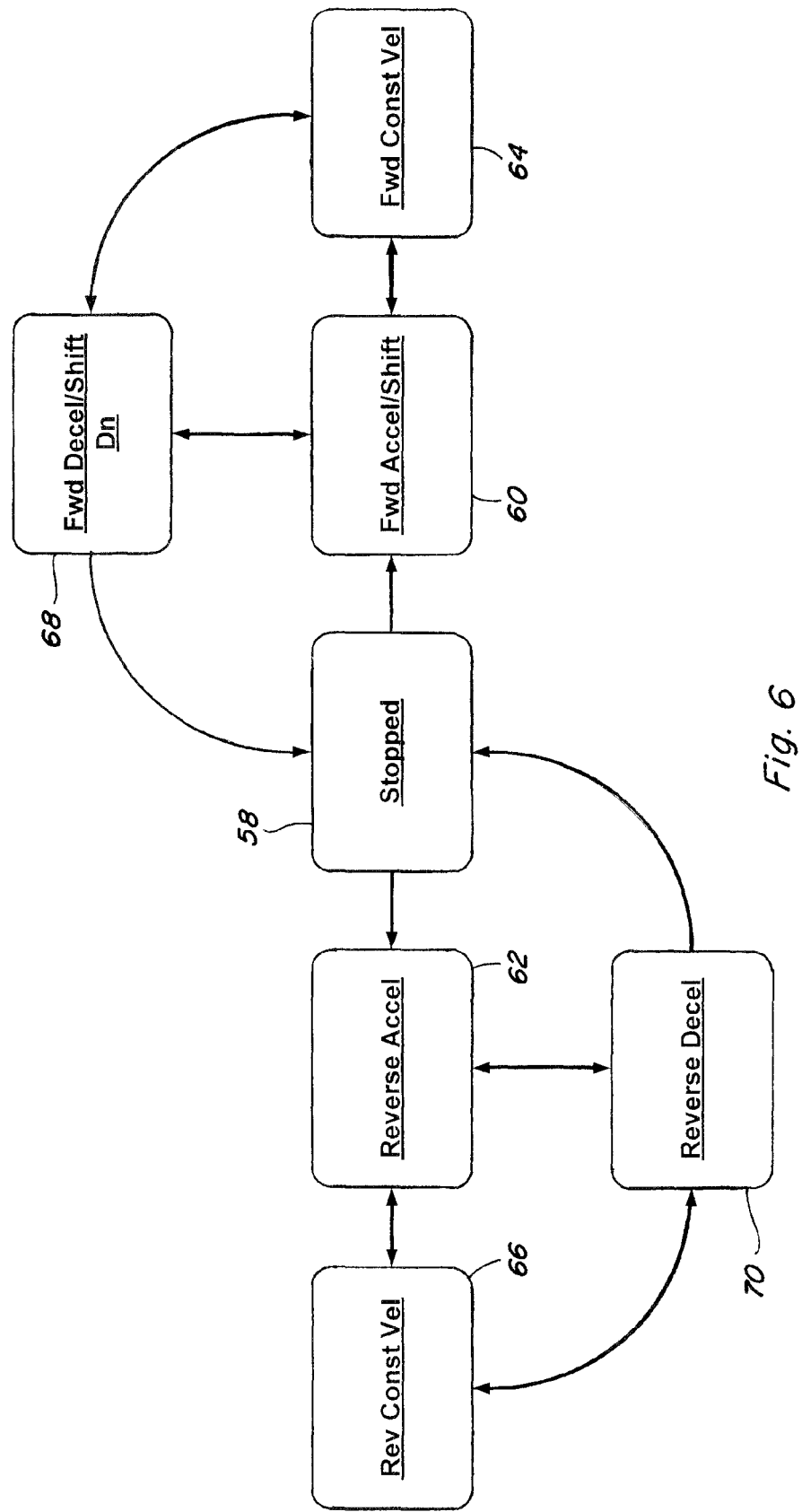
FIG. 6 is a diagram showing possible operating states of the system.

Referring also to FIG. 6, a diagram of possible operating states of the control system 32 of the invention are shown. As is evident, from a stopped state, denoted by block 58, an operator can select forward or reverse acceleration, denoted by blocks 60 and 62, and then constant velocity in the selected direction (blocks 64 and 66), further acceleration, or deceleration (blocks 68 and 70). In the forward operating mode, up shift and down shift, if applicable, can also be selected. Rules governing operation in each of the states of blocks 58 through 70 are set forth in FIGS. 7, 8, 9, 10, 11 and 12, discussed next.

Figure 10:
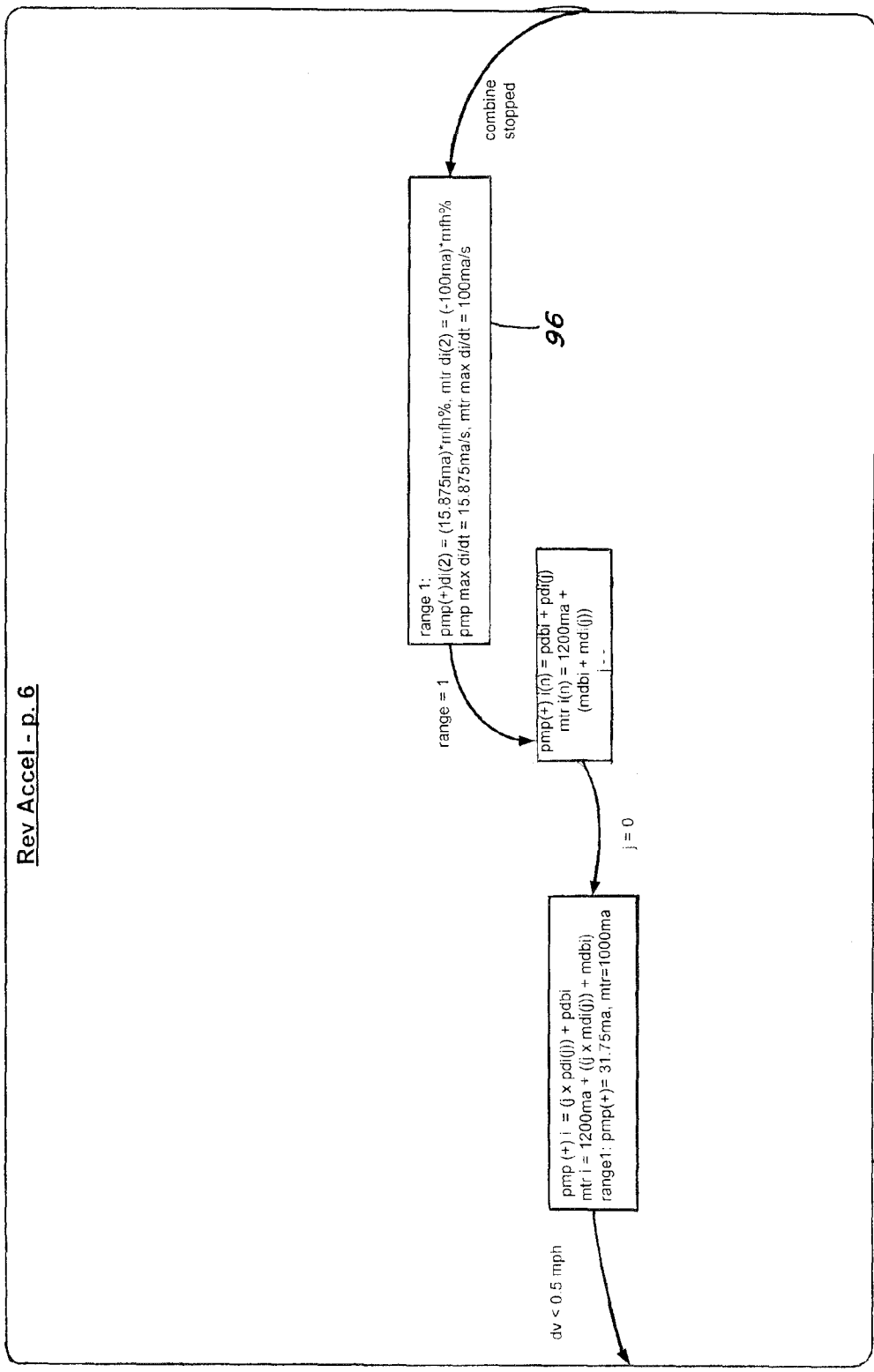
FIG. 10 is a diagram showing rules controlling operation of the system for accelerating in the reverse mode.
Figure 11:
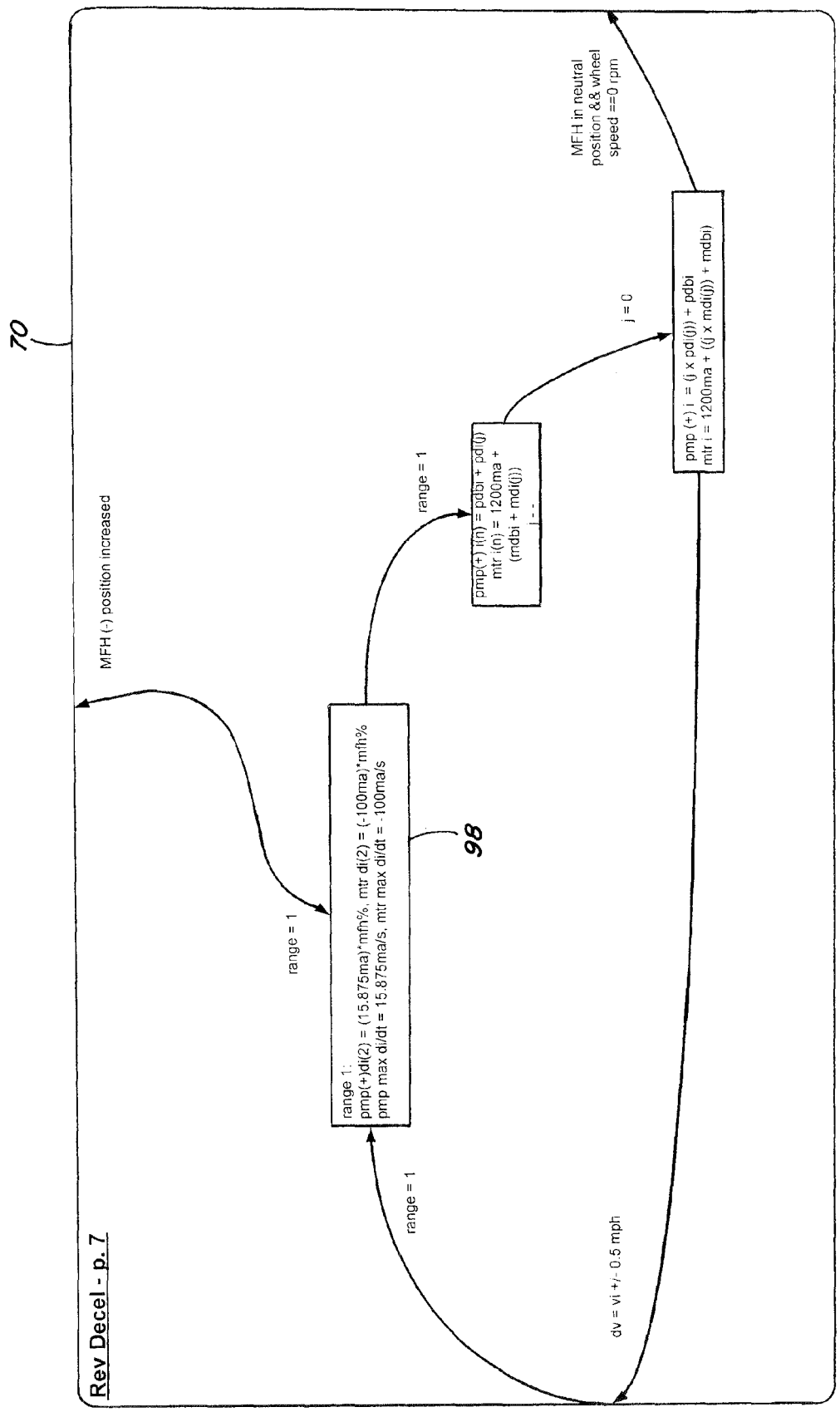
FIG. 11 is a diagram showing rules controlling operation of the system for deccelerating in the reverse mode.
Figure 12:
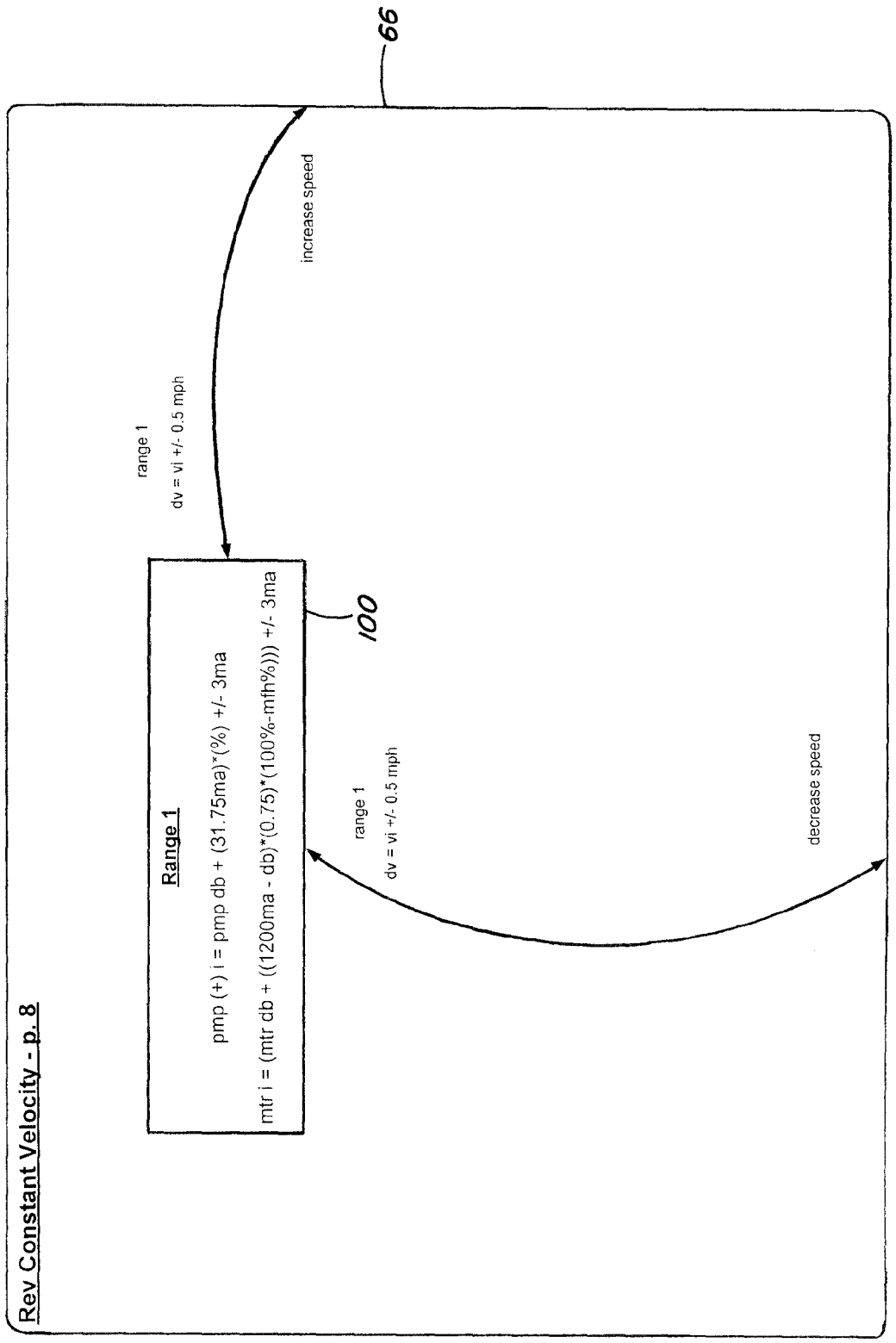
FIG. 12 is a diagram showing rules controlling operation of the system for constant velocity operation in the reverse mode.

FIGS. 7, 8, 9, 10, 11 and 12 shown rules of operation of controller 40 of control system 32 for each of the operating states shown in FIG. 6, responsive to inputted operating commands for those states, including forward acceleration and up shift commands (FIG. 7); forward operation at constant velocity (FIG. 8); forward deceleration and down shifts (FIG. 9); reverse acceleration (FIG. 10); reverse deceleration (FIG. 11); and reverse constant velocity (FIG. 12). As preconditions for operation, the combine engine will be operating, the park brake will be off and the ground drive enabled. Abbreviations used are as follows.
 a. db=dead band
 b. dbi=dead band current
 c. pmp=pump
 d. mtr=motor
 e. j=increment or decrement iteration number (integer)
 f. MFH or mfh=multi-function handle
 g. pdbi=pump dead band current
 h. mdbi=motor dead band current
 i. i=current
 j di=current change
 k dt=time change Referring in particular to FIG. 7, operation in the forward operating mode requires that the MFH be in a forward orientation. Any of the four forward speed ranges may be selected, and from any speed range, any of the other speed ranges can be selected. For each speed range, the maximum pump current signal value and the minimum motor current signal value that can be outputted by controller 40 is predetermined, and will be different from those for the other speed ranges, so as to establish the maximum motor speed of rotation for the speed range, and thus the maximum ground speed in that range. For example, as denoted in block 72, it can be observed that for range 1, the maximum pump current will be equal to 31.75 milliamps (ma), which is a value corresponding to a relatively low pump displacement, that is, one providing low fluid flow, whereas the minimum motor current will be equal to 1000 ma, corresponding to a high or maximum displacement, and thus a low motor rotational speed capability. For range 4, as denoted in block 74, in comparison, the maximum pump current will equal 85 ma, which provides a high pump displacement and fluid flow, and the motor current will equal 400 ma which provides a low displacement and thus a high rotational speed capability. As illustrated, the pump and motor current signal ranges for the intermediate speed ranges 2 and 3 lie between those for ranges 1 and 4, as denoted in blocks 76 and 78.

Figure 7:
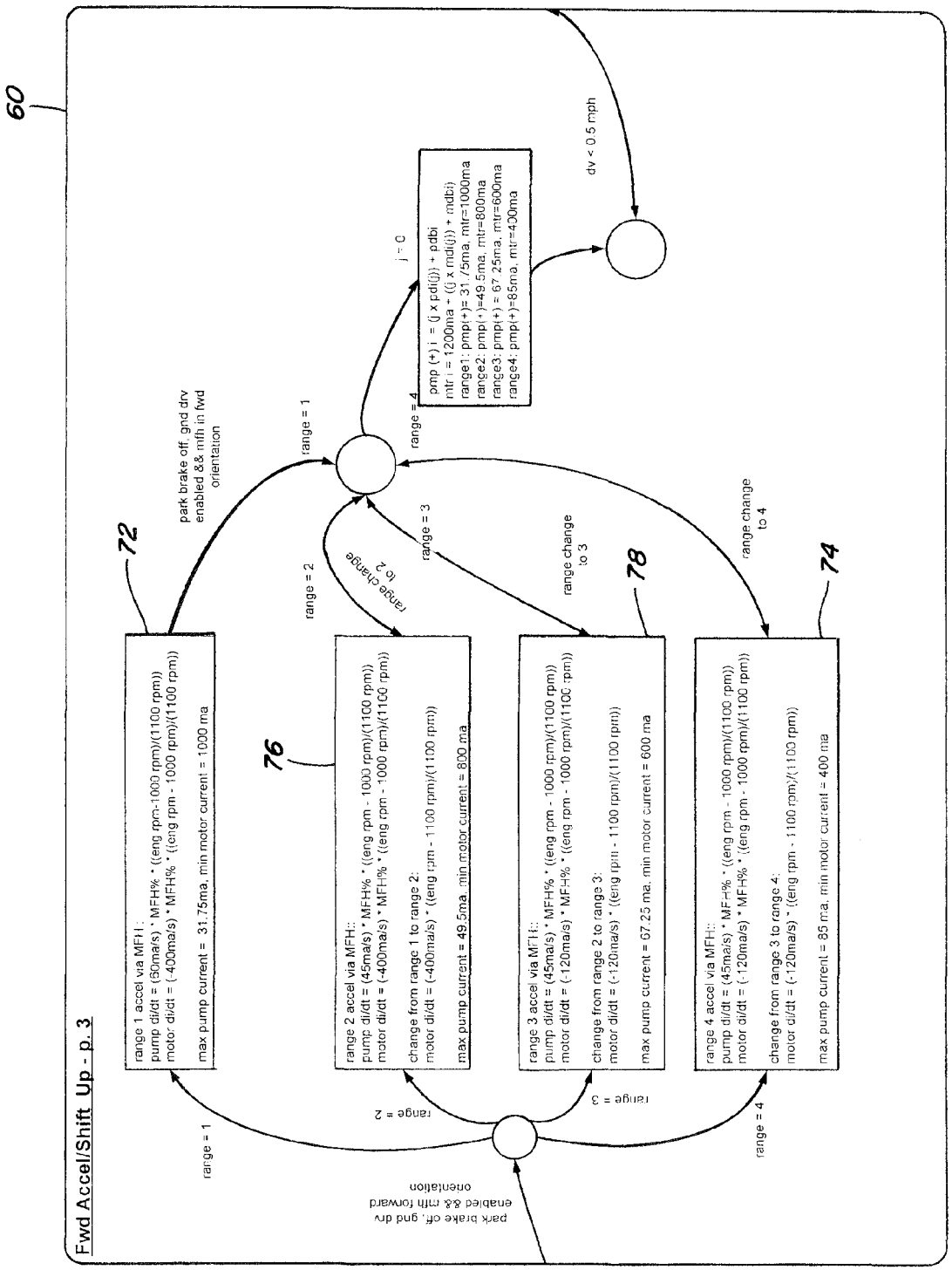
FIG. 7 is a diagram showing rules controlling operation of the system for accelerating and up shifting when in the forward mode.

As also illustrated in FIG. 7, rules governing acceleration within each speed range are shown. Essentially, the preferred manner of acceleration control controls the rate of change of pump current and motor current in an inverse relationship, as a function of increases in MFH position. That is, responsive to increasing MFH position, controller 40 controls pump current, and thus pump displacement, to increase, and motor current, and thus displacement, to decrease, which will result in an increase in motor speed at a corresponding rate. This rate is controlled independently of the rate or speed of movement of the MFH, such that the acceleration in ground speed is controlled. As an example, again referring to block 72, for range 1, the rule governing rate of change of the pump current is:

$$di/dt = (60 \text{ ma/s}) * \text{MFH \%} * ((\text{engine rpm} - 1000 \text{ rpm})/(1100 \text{ rpm})),$$

while the rule for motor current is $$di/dt = (-400 \text{ ma/s}) * \text{MFH \%} * ((\text{engine rpm} - 1000 \text{ rpm})/(1100 \text{ rpm})).$$

For range 2, as shown in block 76, the rule for the rate of change of the pump current is:

$$di/dt = (45 \text{ ma/s}) * \text{MFH \%} * ((\text{engine rpm} - 1000 \text{ rpm})/(1100 \text{ rpm}))$$

and the rate of change of motor current is $$di/dt = (-400 \text{ ma/s}) * \text{MFH \%} * ((\text{engine rpm} - 1000 \text{ rpm})/(1100 \text{ rpm})).$$

For range 3 and range 4 acceleration, as shown in blocks 78 and 74, the rate of change of pump current is again:

$$di/dt = (45 \text{ ma/s}) * \text{MFH \%} * ((\text{engine rpm} - 1000 \text{ rpm})/(1100 \text{ rpm})),$$

but the rate of change of the motor current is:

$$di/dt = (-120 \text{ ma/s}) * \text{MFH \%} * ((\text{engine rpm} - 1000 \text{ rpm})/(1100 \text{ rpm})).$$

Thus, it can be observed that acceleration is or can be controlled in a different manner for each speed range, here, the allowed acceleration being greater for lower speed ranges, and less for the higher speed ranges.

For up shifts, as noted above, the maximum speed of rotation of the motors is increased, and motor speed is effected by reducing motor displacement. Thus, for up shifts at a given MFH position, only motor displacement need be changed. As an example, for an up shift from range 1 to range 2, controller 40 will change motor displacement at a rate according to the following rule:

$$\text{motor } di/dt = (-400 \text{ ma/s}) * ((\text{engine rpm} - 1100 \text{ rpm})/(1100 \text{ rpm})).$$

For an up shift from range 2 to range 3, and from range 3 to range 4, the governing rule is:

$$\text{motor } di/dt = (-120 \text{ ma/s}) * ((\text{engine rpm} - 1100 \text{ rpm})/(1100 \text{ rpm})).$$

The selected rates of motor current change differ, to provide desired controlled smooth acceleration to the new speed, as a function of the current and new speed ranges. Here, it should be noted that a speed change shift can be made alone, or with a MFH position change. Note here also that the stated minimum motor current values correspond to those set forth for each speed range in FIG. 3.

Additionally, it can be observed that an iterative technique is used for achieving the set speed for the new speed range and/or MFH position), as a function of the dead band current values and the integer j, which provides the desired controlled speed change, and independence from the rate of movement of the MFH. Thus, for example, if the operator moves the MFH rapidly, no sudden jerking movement of the combine will occur as a result.

Figure 8:
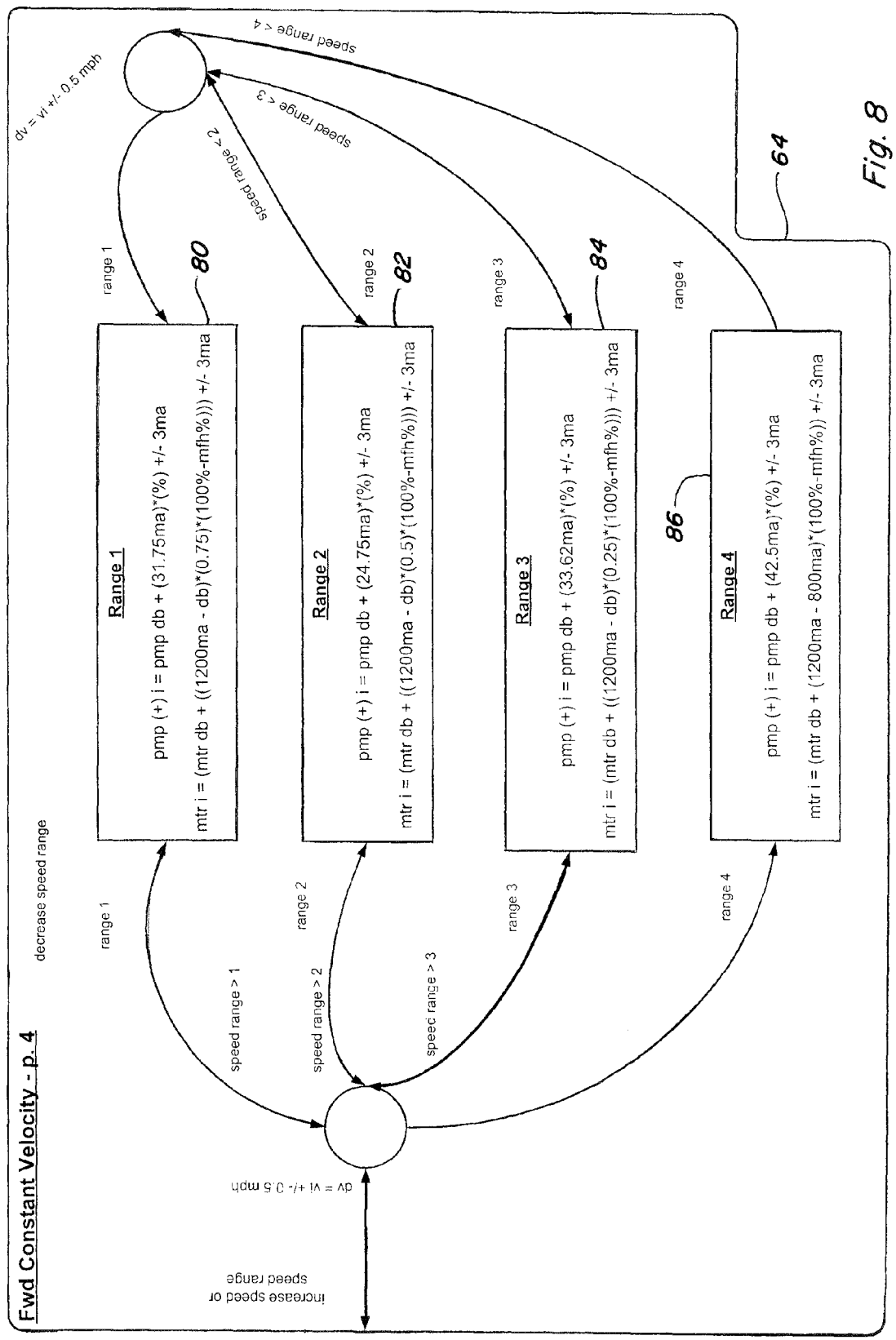
FIG. 8 is a diagram showing rules controlling operation of the system for constant velocity operation in the forward mode.

Referring also to FIG. 8, rules governing constant velocity forward operation are shown. As an example, as illustrated in block 80, in range 1, pump current is controlled by the rule:

$$\text{pmp}(+)i = \text{pmp db} + (31.75 \text{ ma}) * (\text{MFH \%}) \pm 3 \text{ ma}$$

and motor current by the rule:

$$\text{mtr } i = (\text{mtr db} + ((1200 \text{ ma} - \text{db}) * (0.75) * (100\% - \text{MFH \%}))) \pm 3 \text{ ma}.$$

Constant velocity operation in each of the other speed ranges is governed by individualized rules, as illustrated in blocks 82 (range 2), 84 (range 3), and 86 (range 4). Again, for each speed range, the governing rule is different, to provide desired performance for that speed range. Here, it can be noted that constant velocity operation is additionally a function of the pump and motor current dead band currents, and a weighting factor is used for each speed range, e.g., 0.75 for range 1, and 0.5 for range 2.

Figure 9:
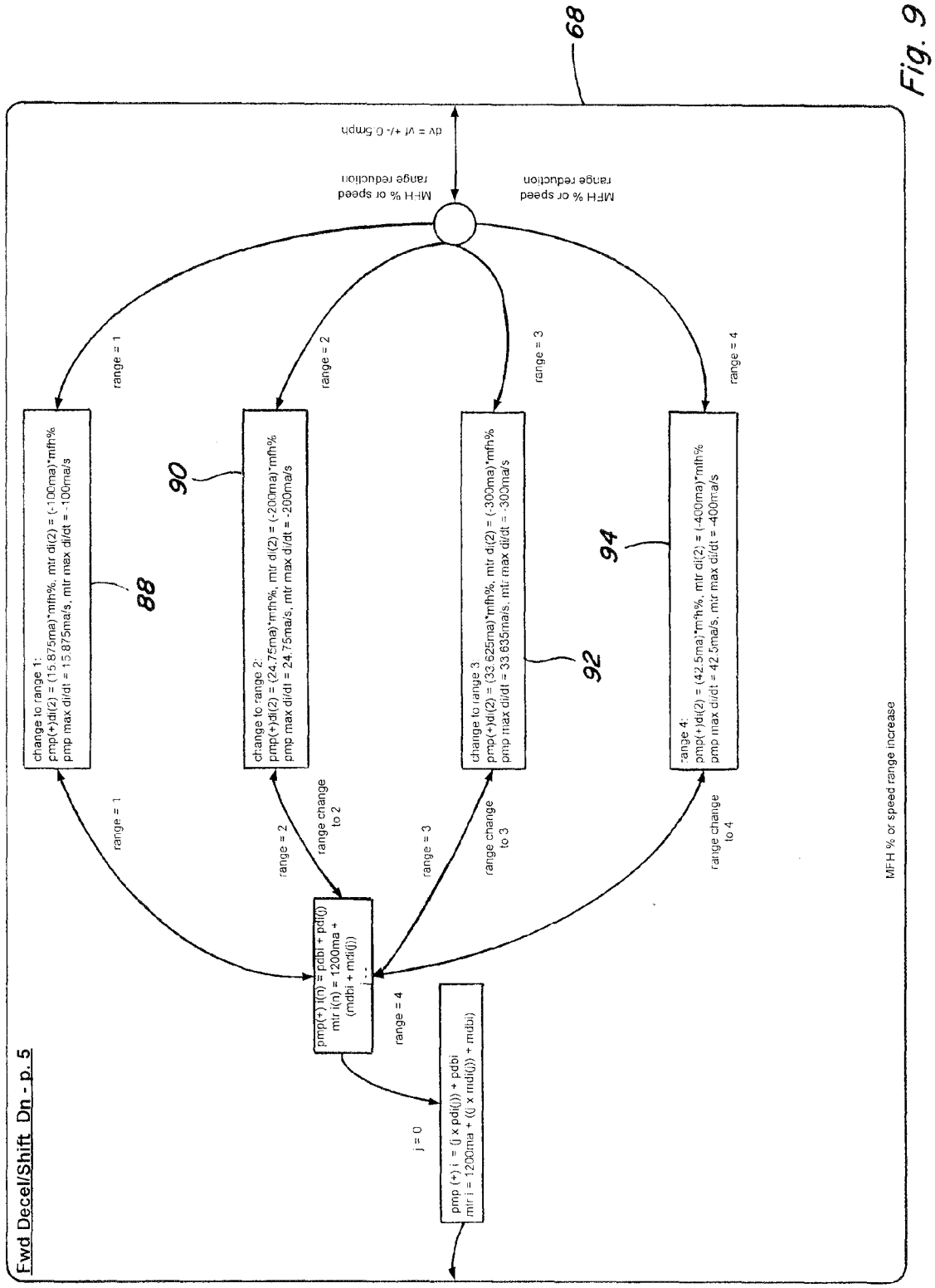
FIG. 9 is a diagram showing rules controlling operation of the system for decceleration when in the forward mode.

In FIG. 9, the rules governing forward deceleration and down shifts to each of the speed ranges are indicated by blocks 88 (range 1), 90 (range 2), 92 (range 3), and 94 (range 4). Here, it should be noted that deceleration is a function of factors including MFH position, a weighting factor, and maximum rates of change for both pump and motor current, which are different for the respective speed ranges, and can factor in the momentum of the combine which must be overcome, which will be greater for higher ground speeds. Again, an iterative technique is used for achieving the new speed corresponding to the new speed range or MFH position, which is a function of the dead band current values and the integer j.

FIG. 10 illustrates the rules controlling reverse acceleration. There is only one reverse speed range, and the pump current is set forth in block 96, as a function of a weighting factor of 15.875 and the MFH position. A maximum rate of change of pump current and motor current are also set, so as to be independent of the rate of movement of the MFH. Again, an iterative technique is used for achieving the new speed.

In FIG. 11, the rules governing reverse acceleration are shown in block 98, both pump and motor current values being a function of a weighting factor and the MFH position. The rate of deceleration is controlled also, independent of the rate of movement of the MFH, by controlling maximum rate of change of pump and motor current, and using the iterative technique to arrive at the ground speed for the selected MFH position.

FIG. 12 shows the rule governing reverse constant velocity operation. Referring to block 100, pump and motor current are controlled in essentially the same manner as for range 1 of the forward speed range:

$$pmp(+)i = pmp\ db + (31.75\ ma)*(MFH\ \%) \pm 3\ ma$$

and motor current by the rule:

$$mtr\ i = (mtr\ db + ((1200\ ma-db)*(0.75)*(100\%-MFH\ \%))) \pm 3\ ma.$$

Here, it should be understood that it is contemplated that although only one set of rules is disclosed for each ground drive operating state, a wide variety of additional or different rules could be used, as a function of desired operating characteristics, and other factors, without departing from the scope of the invention. It should also be understood that the numerical values of pump and motor currents, weighting factors, and the like are representative, and are not intended as limiting.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A hydrostatic ground drive control system for a work machine, comprising:
a variable displacement fluid pump connected in fluid communication with a plurality of variable displacement fluid motors connected in rotatably driving relation to ground wheels of the machine, respectively;
a programmable processor based controller in operative control of the displacement of the pump and the displacements of the motors, respectively;
an operator controllable first input device connected to the controller and configured to be movable for outputting variable speed signals thereto, the first input device being movable through a range of forward positions for outputting forward speed signals to the controller, through a range of reverse positions for outputting reverse speed signals thereto, and to a neutral position for outputting a neutral position signal thereto;
an operator controllable second input device connected to the controller and configured so as to be usable by an operator for inputting speed range command signals to the controller, including at least a first speed range command signal and a second speed range command signal;
the controller being programmed to automatically simultaneously control the displacements of the pump and the motors in a substantially inverse relationship, including:
a. responsive to changing speed signals for increasing a speed of rotation of the fluid motors, to automatically decrease the displacements of the motors and simultaneously increase the displacement of the pump;
b. responsive to changing speed signals for decreasing a speed of rotation of the fluid motors, to automatically increase the displacements of the motors and simultaneously decrease the displacement of the pump; and
c. responsive to a change in the speed range command signal, to automatically change the displacements of the motors at a predetermined rate to predetermined values, respectively, corresponding to the speed signal outputted by the first input device.

2. The ground drive control system of claim 1, wherein the controller is programmed such that when a sequence of the speed signals outputted by the first input device are representative of movement of the first input device from one of the ranges of positions to the other of the ranges of positions and the wheels are drivingly rotated by the motors, the controller will automatically change the direction of the rotation of the motors.

3. The ground drive control system of claim 1, wherein the controller is programmed such that when the first speed range command signal is inputted thereto, the controller will control the displacements of the pump and the motors, respectively, for rotating the motors at speeds within a first speed range responsive to the position of the first input device, and such that when the second speed range command signal is inputted to the controller, the controller will control the displacements of the pump and the motors, respectively, for rotating the motors at speeds within a second speed range responsive to the position of the first input device, the second speed range including and exceeding the first speed range.

4. The ground drive control system of claim 3, wherein the second input device is additionally configured so as to be usable by an operator for inputting a third speed range command signal and a fourth speed range command signal to the controller, respectively, and wherein the controller is programmed such that when the third speed range command signal is inputted thereto, the controller will control the displacements of the pump and the motors, respectively, for rotating the motors at speeds within a third speed range responsive to the position of the first input device, and such that when the fourth speed range command signal is inputted to the controller, the controller will control the displacements of the pump and the motors, respectively, for rotating the motors at speeds within a fourth speed range responsive to the position of the first input device, the third speed range including and exceeding the second speed range, and the fourth speed range including and exceeding the third speed range.

5. The ground drive control system of claim 4, wherein the wheels of the machine comprise rear wheels and front wheels, respectively, and at least one of the motors is connected in driving relation to the front wheels, and at least one of the motors is connected in driving relation to the rear wheels, and wherein the controller is programmed to control the displacement of the at least one of the motors in connection with the rear wheels for drivingly rotating the rear wheels only when the first speed range command signal or the second speed range command signal is received by the controller.

6. The ground drive control system of claim 5, further comprising a third input device in connection with the controller and operable by an operator for inputting a rear axle assist command signal to the controller, and wherein the controller is programmed to control the displacement of the at least one of the motors in connection with the rear wheels to drivingly rotate the rear wheels only when the rear axle assist command has been received.

7. The ground drive control system of claim 1, wherein the first input device comprises a multi-function handle.

8. The ground drive control system of claim 1, wherein the machine comprises an agricultural combine.

9. The ground drive control system of claim 1, wherein the substantially inverse relationship is at least generally linear.

10. The ground drive of claim 1, wherein responsive to the speed signals for decreasing a speed of rotation of the fluid motors, the controller will automatically increase the displacements of the motors and simultaneously decrease the displacement of the pump at a predetermined rate.

11. The ground drive control system of claim 10, wherein when the pump and the motors are in the first speed range and the speed signals for decreasing the speed of rotation of the fluid motors are present, the predetermined rate of the increase of the displacements of the motors and the decrease of the displacement of the pump will be different than when the pump and the motors are in the second speed range and the speed signals for decreasing the speed of rotation of the fluid motors are present.

12. A hydrostatic ground drive control system for a work machine, comprising:
   a variable displacement fluid pump connected in fluid communication with a plurality of variable displacement fluid motors connected in rotatably driving relation to ground wheels of the machine, respectively;
   a processor based programmable controller in operative control of the displacement of the pump and the displacements of the motors, respectively;
   a operator controllable first input device connected to the controller and configured to be movable for outputting variable speed signals thereto, the first input device being movable through a range of forward positions for outputting forward speed signals to the controller, through a range of reverse positions for outputting reverse speed signals thereto, and to a neutral position for outputting a neutral position signal thereto;
   an operator controllable second input device connected to the controller and configured so as to be usable by an operator for selectably inputting a plurality of speed range command signals to the controller, respectively, including at least a first speed range command signal, a second speed range command signal, and a third speed range command signal;
   the controller being programmed to automatically simultaneously variably control the displacements of the pump and the motors in a substantially inverse relationship responsive to the speed signals from the first input device, including:
   a. to automatically decrease the displacements of the motors and simultaneously increase the displacement of the pump responsive to predetermined speed signals for increasing a speed of rotation of the motors;
   b. to automatically increase the displacements of the motors and simultaneously decrease the displacement of the pump responsive to speed signals for decreasing a speed of rotation of the motors; and
   c. to automatically change the displacements of at least the motors at a predetermined rate to predetermined values, respectively, responsive to a change in the speed range command signal and in a manner corresponding to the speed signal outputted by the first input device.

13. The ground drive control system of claim 12, wherein the controller is programmed such that when a sequence of the speed signals outputted by the first input device are representative of movement of the first input device from one of the ranges of positions to the other of the ranges of positions, and the wheels are being drivingly rotated by the motors, the controller will automatically cause the direction of rotation of the motors to change.

14. The ground drive control system of claim 12, wherein the controller is programmed such that when the first speed range command signal is inputted thereto, the controller will control the displacements of the pump and the motors, respectively, for rotating the motors at speeds within a first speed range responsive to the position of the first input device; such that when the second speed range command signal is inputted to the controller, the controller will control the displacements of the pump and the motors, respectively, for rotating the motors at speeds within a second speed range responsive to the position of the first input device, the second speed range including and exceeding the first speed range; and such that when the third speed range command signal is inputted to the controller, the controller will control the displacements of the pump and the motors, respectively, for rotating the motors at speeds within a third speed range responsive to the position of the first input device, the third speed range including and exceeding the second speed range.

15. The ground drive control system of claim 14, wherein the second input device is additionally configured so as to be usable by an operator for selecting and inputting a fourth speed range command signal to the controller, and wherein the controller is programmed such that when the fourth speed range command signal is inputted thereto, the controller will control the displacements of the pump and the motors, respectively, for rotating the motors at speeds within a fourth speed range responsive to the position of the first input device, the fourth speed range including and exceeding the third speed range.

16. The ground drive control system of claim 15, wherein the wheels of the machine comprise rear wheels and front wheels, respectively, and at least one of the motors is connected in driving relation to the front wheels, and at least one of the motors is connected in driving relation to the rear wheels, and wherein the controller is programmed to control the displacement of the at least one of the motors in connection with the rear wheels for drivingly rotating the rear wheels only when the first speed range command signal or the second speed range command signal is received by the controller.

17. The ground drive control system of claim 16, further comprising a third input device in connection with the controller and operable by an operator for inputting a rear axle assist command signal to the controller, and wherein the controller is programmed to control the displacement of the at least one of the motors in connection with the rear wheels to drivingly rotate the rear wheels only when the rear axle assist command has been received.

18. The ground drive control system of claim 12, wherein the first input device comprises a multi-function handle.

19. The ground drive control system of claim 12, wherein the machine comprises an agricultural combine.

20. The ground drive control system of claim 12, wherein the substantially inverse relationship is at least generally linear.

21. A hydrostatic ground drive control system for an agricultural combine, comprising:
   a variable displacement fluid pump connected in fluid communication with a plurality of variable displacement fluid motors connected in rotatably driving relation to ground wheels of the combine, respectively;
   a processor based programmable controller in operative control of the displacement of the pump and the displacements of the motors, respectively;
   a operator controllable first input device connected to the controller and configured to be movable for outputting variable speed signals thereto, the first input device being movable through a range of forward positions for outputting forward speed signals to the controller, through a range of reverse positions for outputting reverse speed signals thereto, and to a neutral position for outputting a neutral position signal thereto;
   an operator controllable second input device connected to the controller and configured so as to be usable by an operator for selectably inputting a plurality of speed range command signals to the controller, respectively, including at least a first speed range command signal, a second speed range command signal, and a third speed range command signal;

the controller being programmed to automatically simultaneously variably control the displacements of the pump and the motors in a substantially inverse relationship responsive to the speed signals from the first input device, including:

a. to automatically decrease the displacements of the motors and simultaneously increase the displacement of the pump responsive to predetermined speed signals for increasing a speed of rotation of the motors;

b. to automatically increase the displacements of the motors and simultaneously decrease the displacement of the pump responsive to speed signals for decreasing a speed of rotation of the motors; and c. to automatically change the displacements of at least the motors at a predetermined rate to predetermined values, respectively, responsive to a change in the speed range command signal and in a manner corresponding to the speed signal outputted by the first input device.

22. The ground drive control system of claim 21, wherein the controller is programmed such that when a sequence of the speed signals outputted by the first input device are representative of movement of the first input device from one of the ranges of positions to the other of the ranges of positions, and the wheels are being drivingly rotated by the motors, the controller will automatically cause the direction of rotation of the motors to change.

23. The ground drive control system of claim 21, wherein the controller is programmed such that when the first speed range command signal is inputted thereto, the controller will control the displacements of the pump and the motors, respectively, for rotating the motors at speeds within a first speed range responsive to the position of the first input device; such that when the second speed range command signal is inputted to the controller, the controller will control the displacements of the pump and the motors, respectively, for rotating the motors at speeds within a second speed range responsive to the position of the first input device, the second speed range including and exceeding the first speed range; and such that when the third speed range command signal is inputted to the controller, the controller will control the displacements of the pump and the motors, respectively, for rotating the motors at speeds within a third speed range responsive to the position of the first input device, the third speed range including and exceeding the second speed range.

24. The ground drive control system of claim 23, wherein the second input device is additionally configured so as to be usable by an operator for selecting and inputting a fourth speed range command signal to the controller, and wherein the controller is programmed such that when the fourth speed range command signal is inputted thereto, the controller will control the displacements of the pump and the motors, respectively, for rotating the motors at speeds within a fourth speed range responsive to the position of the first input device, the fourth speed range including and exceeding the third speed range.

25. The ground drive control system of claim 24, wherein the wheels of the combine comprise rear wheels and front wheels, respectively, and at least one of the motors is connected in driving relation to the front wheels, and at least one of the motors is connected in driving relation to the rear wheels, and wherein the controller is programmed to control the displacement of the at least one of the motors in connection with the rear wheels for drivingly rotating the rear wheels only when the first speed range command signal or the second speed range command signal is received by the controller.

26. The ground drive control system of claim 25, further comprising a third input device in connection with the controller and operable by an operator for inputting a rear axle assist command signal to the controller, and wherein the controller is programmed to control the displacement of the at least one of the motors in connection with the rear wheels to drivingly rotate the rear wheels only when the rear axle assist command has been received.

27. The ground drive control system of claim 21, wherein the first input device comprises a multi-function handle.

28. The ground drive control system of claim 21, wherein the substantially inverse relationship is at least generally linear.

* * * * *